US012661850B1

(12) United States Patent
Tian et al.

(10) Patent No.: US 12,661,850 B1
(45) Date of Patent: Jun. 23, 2026

(54) REPLACEABLE SCREEN CARTRIDGE SYSTEM FOR THREE-DIMENSIONAL PRINTERS

(71) Applicant: SprintRay, Inc., Los Angeles, CA (US)

(72) Inventors: Huijian Tian, Los Angeles, CA (US); Abdol Hossein Bassir, Los Angeles, CA (US); Shukun Ye, Los Angeles, CA (US)

(73) Assignee: SprintRay, Inc., Los Angeles, CA (US)

( * ) Notice: Subject to any disclaimer, the term of this patent is extended or adjusted under 35 U.S.C. 154(b) by 79 days.

(21) Appl. No.: 18/244,820

(22) Filed: Sep. 11, 2023

Related U.S. Application Data

(60) Provisional application No. 63/405,367, filed on Sep. 9, 2022.

(51) Int. Cl.
| | |
|---|---|
| *B29C 64/282* | (2017.01) |
| *B29C 64/25* | (2017.01) |
| *B29C 64/255* | (2017.01) |
| *B29C 64/264* | (2017.01) |
| *B33Y 30/00* | (2015.01) |

(52) U.S. Cl.
CPC ............ B29C 64/282 (2017.08); B29C 64/25 (2017.08); B29C 64/255 (2017.08); B29C 64/264 (2017.08); *B33Y 30/00* (2014.12)

(58) Field of Classification Search
CPC ... B29C 64/129; B29C 64/135; B29C 64/264; B29C 64/268; B29C 64/273; B29C 64/277; B29C 64/282; B29C 64/286; B29C 64/291; B29C 71/04; B29C 64/124; B29C 64/25
See application file for complete search history.

(56) References Cited

U.S. PATENT DOCUMENTS

| | | | | |
|---|---|---|---|---|
| 7,775,702 | B2* | 8/2010 | Kuroiwa | G02B 6/009 362/634 |
| 2015/0246482 | A1* | 9/2015 | El-Siblani | B29C 64/241 264/401 |
| 2016/0288412 | A1* | 10/2016 | Stampfl | B29C 64/124 |

FOREIGN PATENT DOCUMENTS

WO    WO-2022110477 A1 *   6/2022

OTHER PUBLICATIONS

Translation WO-2022110477A1, Liu (Year: 2022).*

* cited by examiner

*Primary Examiner* — Philip C Tucker
*Assistant Examiner* — Jimmy R Smith, Jr.
(74) *Attorney, Agent, or Firm* — Jafari Law Group, Inc.

(57) ABSTRACT

A replaceable illumination cartridge system for three-dimensional (3D) printers. The illumination cartridge system includes a cradle assembly that is mounted to an underneath side of a resin tank in a 3D printing system. An illumination cartridge assembly is removably attached to and supported by the cradle for use in providing resin-curing light into the resin tank. Quick release attachment mechanisms may be used to secure the cartridge assembly to the cradle. The illumination cartridge assembly may be removed from the cradle for replacement and/or maintenance, and a new and/or refurbished cartridge may be subsequently reattached to the cradle for continued 3D printing. The illumination cartridge may include a liquid crystal display (LCD) screen or other suitable illumination device.

13 Claims, 16 Drawing Sheets

100

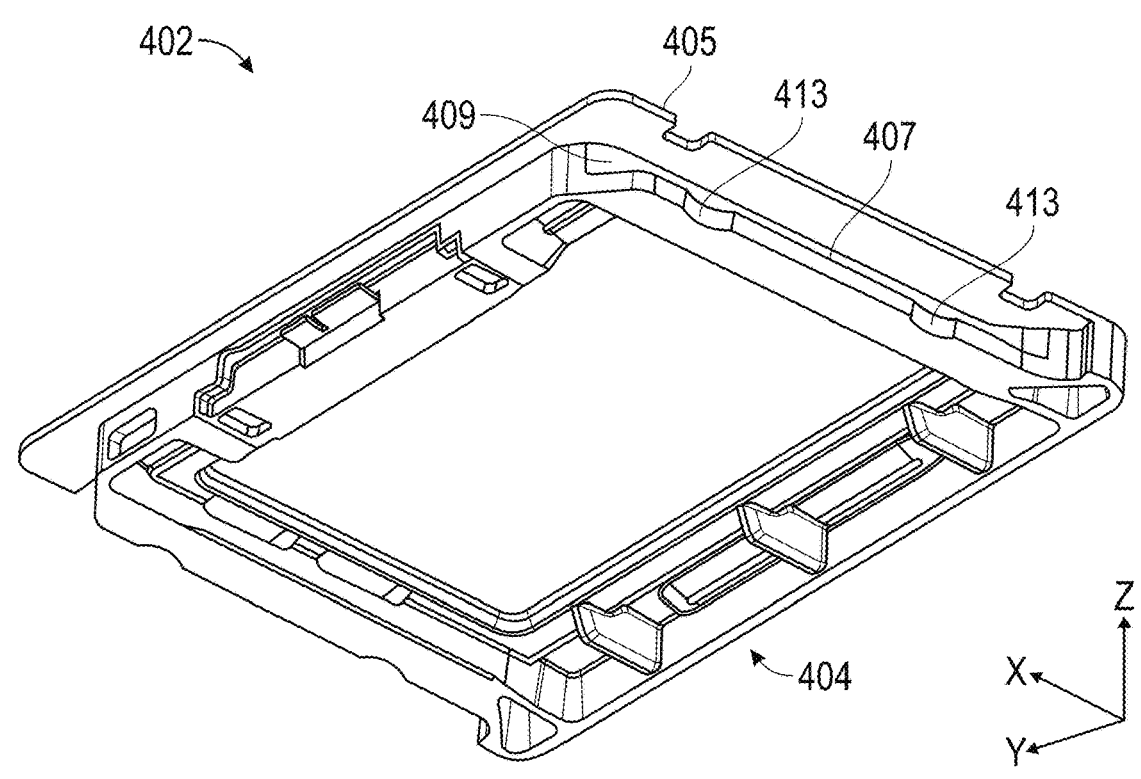
FIG. 15
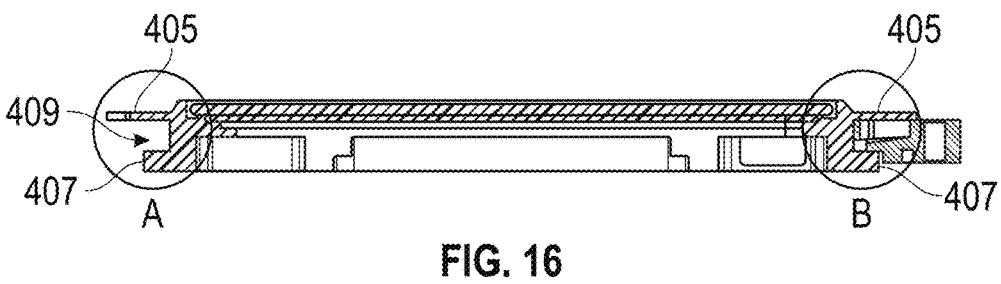
FIG. 16
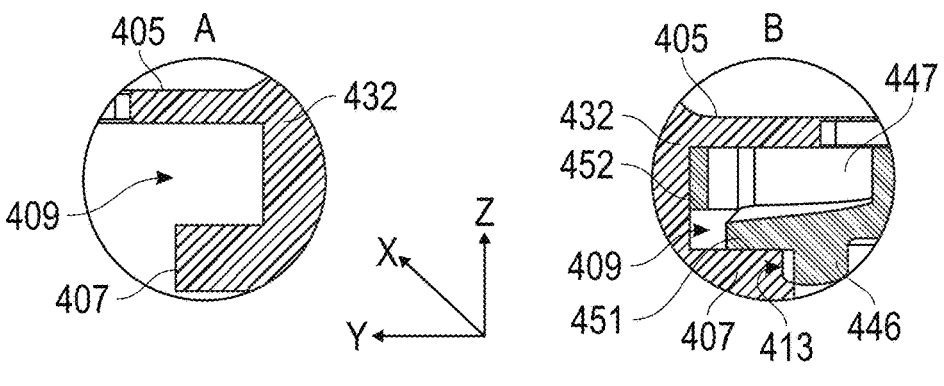
FIG. 17        FIG. 18

REPLACEABLE SCREEN CARTRIDGE SYSTEM FOR THREE-DIMENSIONAL PRINTERS

TECHNICAL FIELD

The present invention generally relates to the field of three-dimensional (3D) printers, including a replaceable and/or removable illumination screen cartridge for 3D printers or additive manufacturing systems.

BACKGROUND

Liquid crystal displays (LCDs) are used throughout the world as illumination sources for three-dimensional printers. Light emitted by the flat LCD panels is directed to the building area within a resin tank to cure the object being printed layer-by-layer. As such, the LCD panels are an essential component to the overall 3D printing system.

In addition, LCD panels have a limited lifespan, and because they are somewhat fragile, they may be damaged (e.g., cracked) during use. When this happens, the LCD panels require replacement and/or maintenance.

However, conventional procedures to remove and subsequently replace LCD panels within current 3D printing systems are currently quite laborious. Such procedures often include over ten specific steps that may require one or more hours to complete. In addition, current systems require highly skilled personnel to perform the maintenance. For example, such systems require optical masking tape to be precisely applied at the perimeter of the LCD panels.

Accordingly, there is a need for a replaceable or removable LCD screen cartridge system for 3D printers or additive manufacturing systems. Also, there is a need for a replaceable LCD screen cartridge system to provide an easy removal method to simplify the screen replacement process. Further, there is a need for a replaceable LCD screen cartridge system that provides an easy screen replacement without the need for extensive training or assembly experience.

SUMMARY

The present invention generally discloses a 3D printer. More specifically, the present invention relates to a replaceable or removable LCD screen cartridge system for 3D printers or additive manufacturing systems.

According to the present invention, the replaceable LCD screen cartridge system is an innovative and intelligent display solution that has been designed to provide easy and simple way to remove and replace the LCD screen used in 3D printers. In some embodiments, the replaceable LCD screen cartridge system may be used for various additive manufacturing systems. Further, the replaceable LCD screen cartridge system provides a simple removal method, which enables the user to easily replace the LCD screen without any extensive training or assembly experience. In some embodiments, the replaceable LCD screen cartridge system comprises an LCD cartridge assembly and a cradle assembly.

The LCD cartridge assembly comprises a cartridge body or cartridge base configured to support and hold one or more components of the LCD cartridge assembly. In some embodiments, the cartridge body is made from a material, including, but not limited to, aluminum, hard plastic, and/or other suitable materials. In some embodiments, the cartridge body comprises an end cap or a plastic cap that encloses a distal end of the cartridge body.

In some embodiments, the LCD cartridge assembly further comprises LCD screen module. In some embodiments, the LCD screen module includes a rigid connector board configured to enable easy connection and disconnection from the LCD cartridge assembly. In some embodiments, the LCD cartridge assembly further comprises a sheet of tempered glass placed over the LCD screen module for protection. In some embodiments, the LCD cartridge assembly further comprises a support glass with Fresnel lens placed underneath the LCD screen module configured to support the LCD screen module to mount in the cavity of the cartridge body.

In some embodiments, the LCD screen module comprises a cradle tray or tank cradle. The tank cradle includes mounting sections configured to receive one or more modules of the LCD screen module. In some embodiments, the LCD screen module further comprises LCD screen and a printed circuit board (PCB) cover. The LCD screen with PCB cover is assembled between a top ring module and a bottom ring module. In some embodiments, the LCD screen module further comprises a cable area or HDMI connector point configured to receive LCD cable. Further, the modules are screwed together using one or more fasteners. In some embodiments, the fasteners may be threaded screws, nuts, and bolts.

The cradle assembly comprises a cradle body or cradle base configured to support one or more components of the cradle assembly. In some embodiments, the cradle body is made from a material including, but not limited to, aluminum or other suitable material. In some embodiments, the cradle body comprises an end cap or plastic cap that encloses a distal end of the cradle body.

In some embodiments, the cradle assembly further comprises a printed circuit board (PCB) for providing easy connection and disconnection from the cradle assembly. In some embodiments, the cradle assembly further comprises a cable area or connector point configured to receive a cable. In some embodiments, the cradle assembly is locked to the LCD cartridge assembly using a lock mechanism. In some embodiments, the lock mechanism is achieved using one or more cam levers.

In some embodiments, the cradle body comprises one or more snaps to lock with the LCD cartridge assembly. In some embodiments, the cradle body further includes one or more grooves to expose the LCD modules. In some embodiments, the cradle body further includes one or more mounting tabs to apply pressure, thereby snugly positioning the mounting tabs into the respective channels to lock the cradle body to the cartridge assembly.

In some embodiments, the LCD screen cartridge utilizes a method for easily disassembling one or more modules of the LCD screen module. The method comprises the following steps. At one step, the LCD screen module is removed from the tank cradle by removing one or more fasteners. At another step, the PCB cover is removed from the LCD screen module. At another step, the LCD cable is unplugged from the cable area or HDMI connector point. At another step, the LCD screen module to be replaced is removed from the tank cradle.

In some embodiments, the LCD screen cartridge utilizes a method for easily assembling one or more modules of the LCD screen module. The method comprises the following steps. At one step, a new LCD screen module is placed on the tank cradle. The LCD screen module may be self-aligned on the tank cradle. At another step, the LCD cable is plugged into the cable area or HDMI connector point. At another step, the PCB cover is placed on the LCD screen module. At another step, the LCD screen module is tightened to the tank cradle using one or more fasteners.

According to one aspect, one or more embodiments are provided below for a screen cartridge system for a three-dimensional (3D) printer, the 3D printer including a resin tank with a first side for receiving resin-curing light, the screen cartridge system comprising a cradle attachable to the first side of the resin tank, and an illumination screen cartridge releasably attachable to the cradle, wherein the illumination screen cartridge provides resin-curing light to the first side of the resin tank.

In another embodiment, the illumination screen cartridge includes a liquid crystal display (LCD) screen to provide the resin-curing light.

In another embodiment, the cradle includes a frame defining a cavity and the illumination screen cartridge is releasably attachable within the cavity.

In another embodiment, the illumination screen cartridge is releasably attachable to the cradle using one or more quick-release locking mechanisms.

In another embodiment, the quick-release locking mechanisms include one or more cam levers.

In another embodiment, the illumination screen cartridge includes one or more first side extensions, and the one or more cam levers, when locked, apply a locking force to the one or more first side extensions.

In another embodiment, the illumination screen cartridge includes one or more first side extensions and one or more second side extensions, each one or more first side extensions aligned with, parallel to, and forming a slot between a corresponding one or more second side extensions.

In another embodiment, the one or more cam levers, when locked, apply a locking force to the one or more first side extensions and to the one or more second side extensions.

In another embodiment, the one or more cam levers, when locked, includes a first cam that applies a first locking force to the one or more first side extensions and a second locking force to the one or more second side extensions, and a second cam that applies a third locking force to the one or more second side extensions.

In another embodiment, the one or more second side extensions includes an indentation, and the second cam applies the third locking force to the indentation.

In another embodiment, the one or more cam levers are configured on an outer side surface of the cradle.

In another embodiment, the cradle includes a first electrical connector and the illumination screen cartridge includes a second electrical connector, and the first electrical connector is mated with the second electrical connector when the illumination screen cartridge is attached to the cradle.

In another embodiment, the illumination screen cartridge includes an illuminating surface, and the screen cartridge system further comprises a sheet of tempered glass positioned over the illuminating surface.

In another embodiment, the illumination screen cartridge includes a Fresnel lens.

In another embodiment, the cradle includes one or more hooks adapted to releasably attach the cradle to the first side of the resin tank.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 15 shows aspects of a screen cartridge assembly in some embodiments of the present invention.

FIG. 16 shows aspects of a replaceable screen cartridge system in some embodiments of the present invention.

FIG. 17 shows aspects of a cartridge assembly in some embodiments of the present invention.

FIG. 18 shows aspects of a replaceable screen cartridge system in some embodiments of the present invention.

DETAILED DESCRIPTION OF EXEMPLARY EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

In general, a replaceable liquid crystal display (LCD) screen cartridge system 100 is provided for use with three-dimensional printing systems. The replaceable LCD screen cartridge system 100 provides a simple removal and replacement method without the need for extensive training or assembly experience.

Figure 1A:
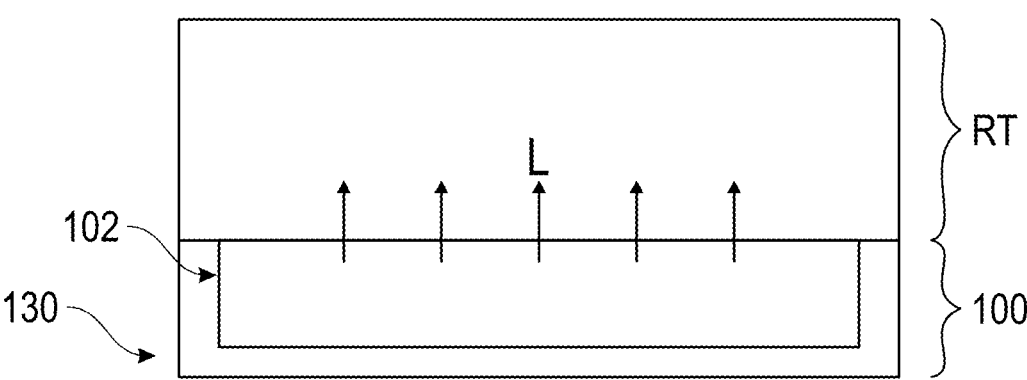
FIGS. 1A and 1B show a block diagram of replaceable screen cartridge system in some embodiments of the present invention.
Figure 1B:
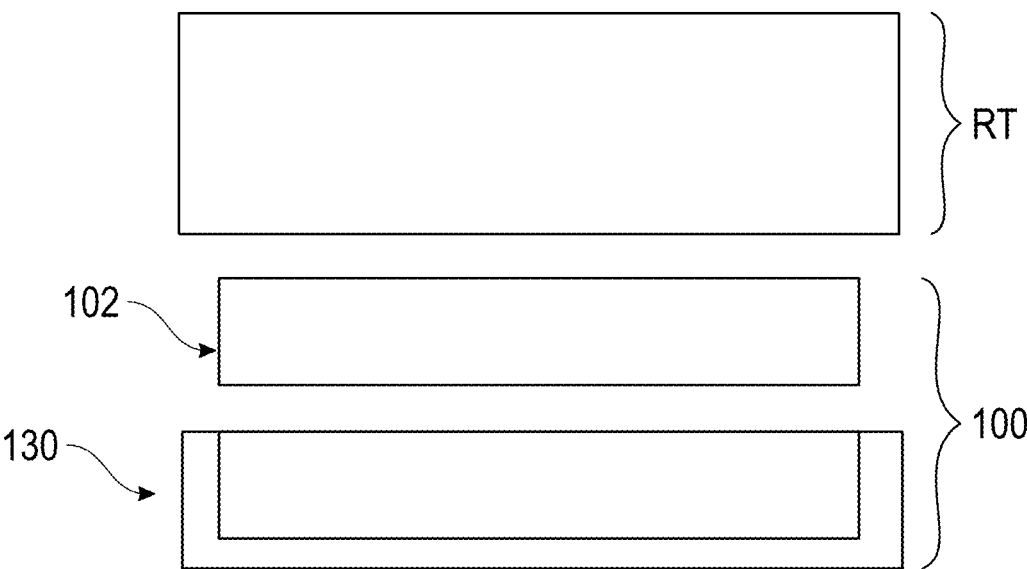

FIG. 1A shows a block diagram of a removable and/or replaceable illumination cartridge system 100 configured with a resin tank RT, e.g., for use with a three-dimensional printing system, and FIG. 1B shows an exploded view of the same. In some embodiments, as shown in FIG. 1A, the illumination cartridge system 100 is secured to the underneath side of the resin tank RT and designed to emit resin-curing light L upward and into the resin tank RT for three-dimensional printing purposes. In some embodiments, the illumination cartridge system 100 includes an illumination cartridge assembly 102 supported by a cradle assembly 130 as shown.

In some embodiments, as shown in FIG. 1B, the illumination cartridge system 100 may be removed from the resin tank RT, and the cartridge assembly 102 may be removed from the cradle assembly 130 for replacement, maintenance, etc. Subsequently, a new and/or refurbished cartridge assembly 102, for example, may be installed into the cradle assembly 130 and the resulting reconfigured illumination cartridge system 100 may be reattached to the resin tank RT for further use (3D printing).

For the purposes of this specification, the removable and/or replaceable illumination cartridge system 100 will be described primarily as including a liquid crystal display (LCD) screen as the illumination source of the system 100. As such, the system 100 may be referred to herein as an LCD screen cartridge system 100 and the illumination cartridge assembly 102 may be referred to herein as an LCD cartridge assembly 102. However, is it understood that the illumination cartridge system 100 may include any type of suitable illumination device(s), and that the scope of the illumination cartridge system 100 is not limited in any way by the type of illumination device(s) that it may utilize.

In some embodiments, as shown in FIGS. 1(A-C) and 2, the removable and/or replaceable LCD screen cartridge system 100 includes an LCD cartridge assembly 102 supported within, and removable from, a cradle assembly 130. In some embodiments, the LCD cartridge assembly 102 includes a body 104 and an upper screen surface 103 (e.g., an LCD screen surface) designed to emit light for 3D printing purposes. In some embodiments, the cradle assembly 130 includes a body 132 including a frame 133 generally surrounding (at least partially) an inner recess or cavity 134 into which the body 104 of the LCD cartridge assembly 102 may be received and secured. Once received into the cavity 134, the LCD cartridge assembly 102 may be releasably locked therein using one or more locking mechanisms 142 (preferably quick-locking and quick-releasing). This will be described in more detail in other sections. In addition, it may be preferable that the LCD cartridge assembly 102 and its upper screen surface 103 seat parallel to the cradle assembly 130 once configured.

Figure 1C:
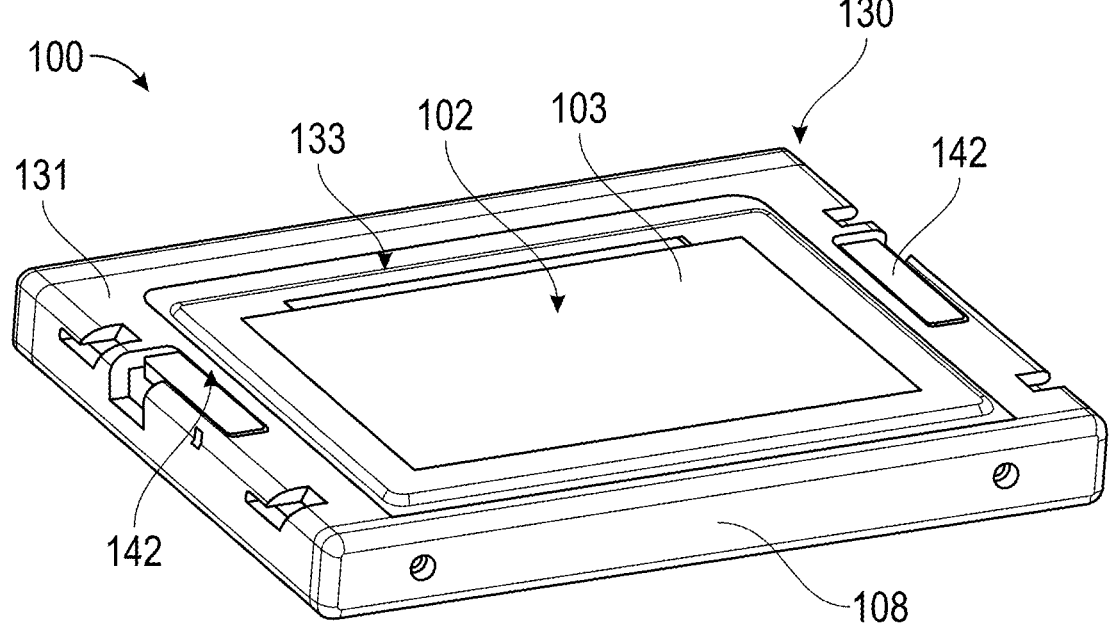
FIG. 1C shows a perspective view of a replaceable screen cartridge system in some embodiments of the present invention.
Figure 2:
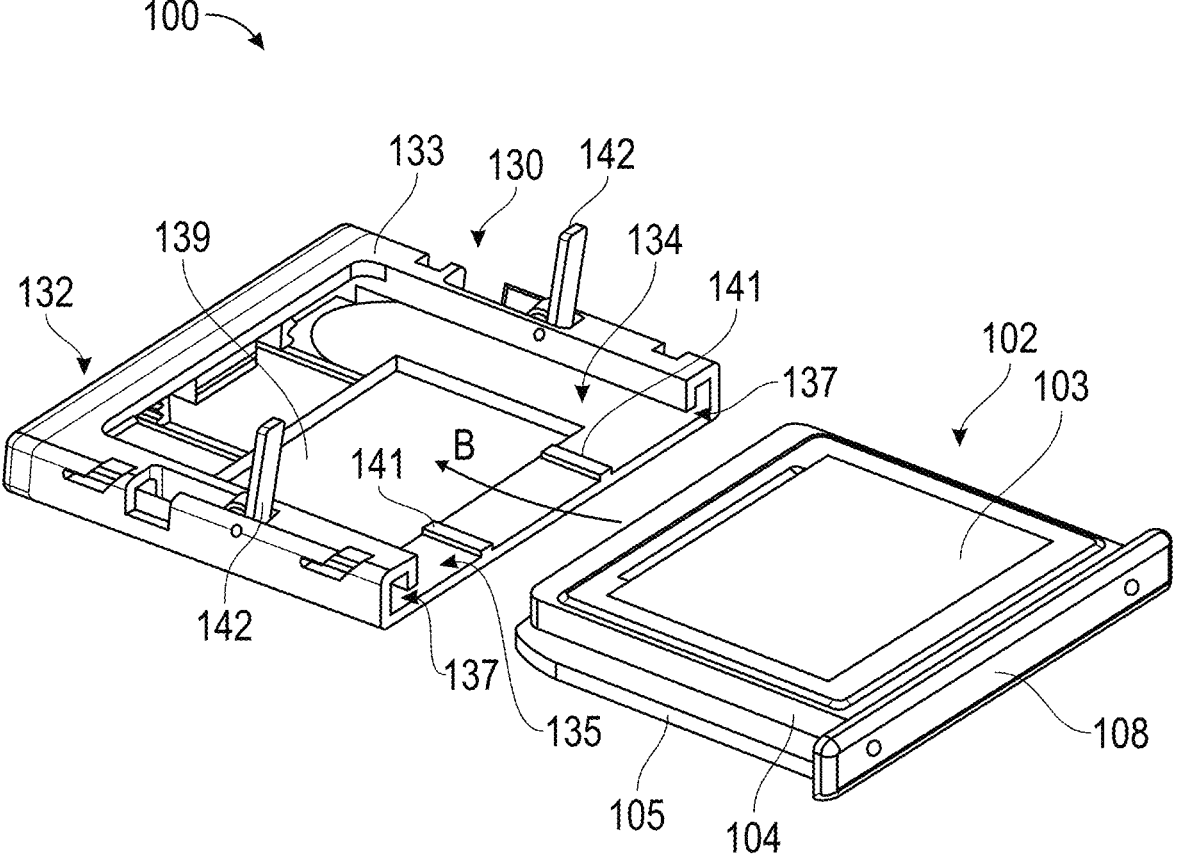
FIG. 2 shows one or more components of the screen cartridge system in some embodiments of the present invention.

In some embodiments, as shown in FIG. 2, the LCD cartridge assembly 102 may be side-loaded into the cradle assembly 130 as depicted by the arrow B. In this case, the cradle's frame 133 may include an open side 135 through which the cartridge assembly 102 may be inserted into the recess 134. In addition, in some embodiments, the frame 133 may include side slots 137 that extend lengthwise along opposing sides of the frame 133 designed to receive longitudinal side extensions 105 extending outward from corresponding opposing sides of the cartridge assembly's body 104. As the cartridge assembly 102 is inserted into the cradle's recess 134, the cartridge's side extensions 105 may slide into the cradle's slots 137. It may be preferable that the side slots 137 in the frame 133 be dimensioned to receive the corresponding side extensions 105 on the cartridge assembly 102 so that the cartridge assembly 102 is held snug within the slots 137 when configured therewith (as shown in FIG. 1C).

In some embodiments, the locking mechanisms 142 may include one or more cam levers as shown in FIGS. 1(A-C) and 2, with the cam levers 142 shown in an unlocked configuration (with the levers extending upward) in FIG. 2, and in a locked configuration (with the levers pressed down and generally flush with the frame 133) as shown in FIG. 1C. When locked, the cam levers 142 may apply a downward locking force to an upper surface of the respective side extensions 105. While the cam levers 142 are shown as generally configured with an upper surface of the cradle assembly 130 in FIG. 2, it also is contemplated that the cam levers 142 may configured with the side surfaces of the cradle assembly 130 (e.g., on the outer side lateral surfaces) such that the cam levers 142 apply a lateral force to the side extensions. Any combinations of cam lever locations also are contemplated. It is understood that other suitable types of locking mechanisms 142 also may be used (e.g., detents, magnets, latches, etc.).

In some embodiments, as shown in FIG. 2, the cradle assembly 102 may include an aperture 139 in its lower surface within the recess 134 such that the cartridge assembly 102 when configured within the recess 134 may receive light passing through the aperture 139 from a projector configured below the system 100 as necessary.

In some embodiments, as shown in FIG. 2, the cradle 130 may include one or more guide structures 141, e.g., rails or channels on the lower surface of the recess 134 that may engage with corresponding guide structures on the bottom surface of the cartridge assembly 102, e.g., channels or rails. These guide structures 141 may thereby facilitate a linear insertion of the cartridge assembly 102 into the cradle assembly 130.

In some embodiments, the side slots 137 in the frame 133, the corresponding side extensions 105 on the cartridge assembly 102, and/or the guide structures 141 on the cradle (and the corresponding guide structures on the cartridge assembly 102) facilitate the self-alignment of the cartridge assembly 102 with respect to the cradle assembly 130 as it is inserted into or otherwise configured with the cradle assembly 130.

In some embodiments, as shown in FIGS. 1(A-C) and 2, the cartridge assembly's body 104 includes an endcap 108 that may abut the cradle's frame 133, e.g., at the open side 135, when the cartridge assembly 104 is inserted fully into the cradle's recess 134. In this way, the endcap 108 may seal the open side 135 of the frame 133 when the system 10 is configured as shown in FIG. 1C.

Figure 3:
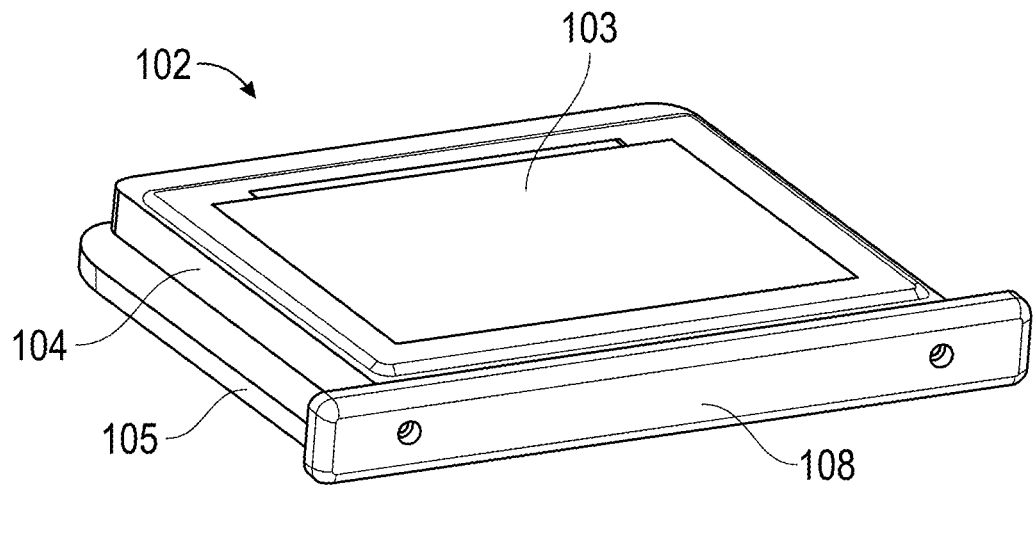
FIGS. 3-4 show different a perspective views of the cartridge assembly in some embodiments of the present invention.
Figure 4:
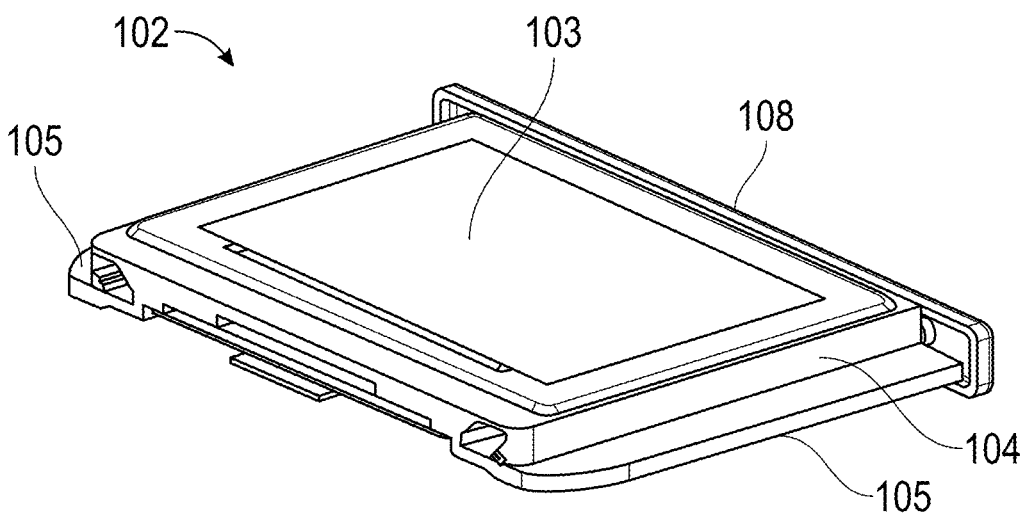
Figure 5:
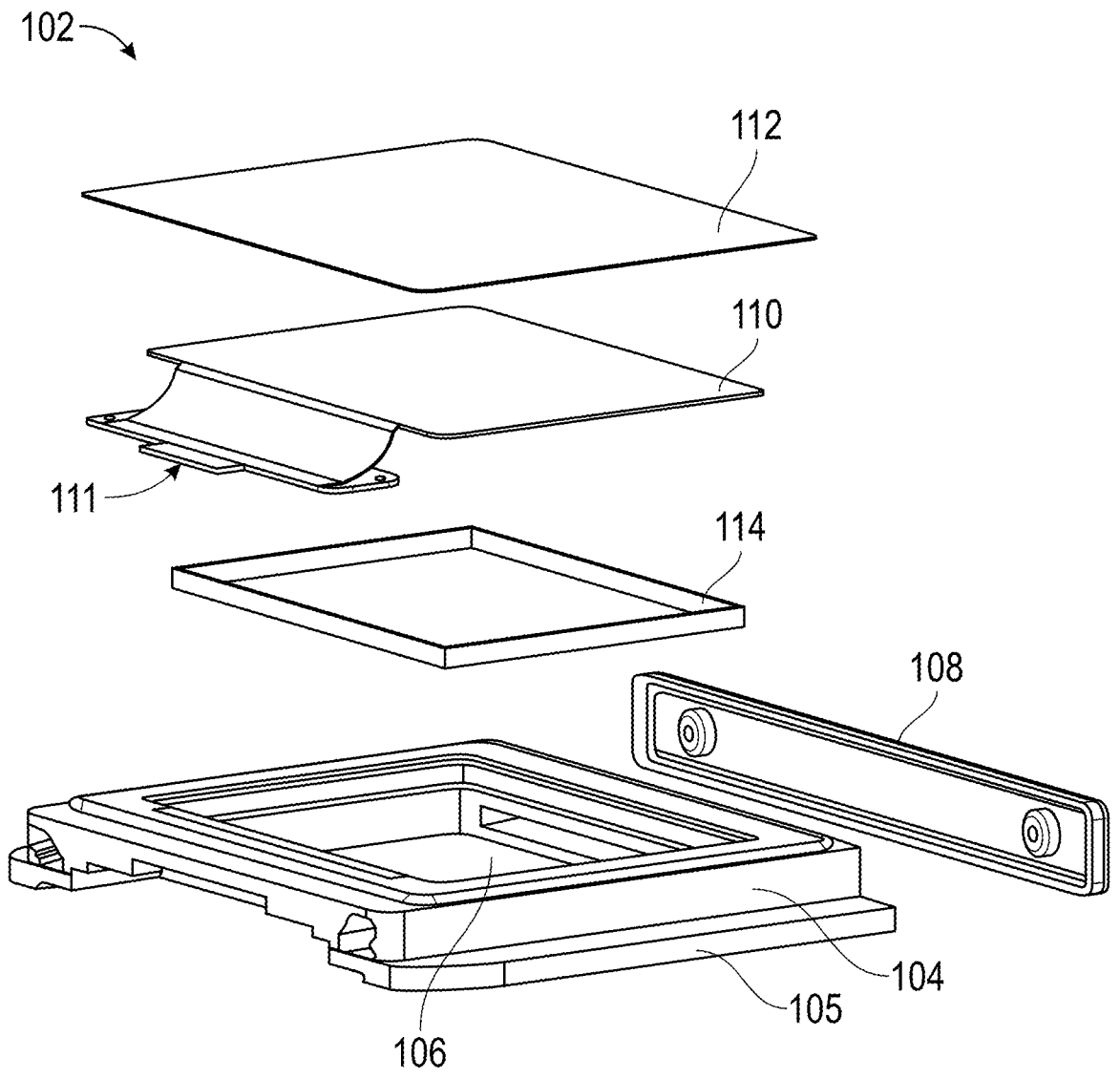
FIG. 5 shows an exploded view of a cartridge assembly in some embodiments of the present invention.

FIGS. 3-5 provide different perspective views of the LCD cartridge assembly 102 of FIGS. 1(A-C) and 2.

FIG. 5 shows an exploded view of the LCD cartridge assembly 102 depicting various elements of the assembly 102. In some embodiments, the cartridge assembly 102 includes a body 104 and a screen module 110 (e.g., an LCD screen module). The assembly's body 104 may include a recess or cavity 106 designed to receive and secure the LCD screen module 110 therein.

In some embodiments, the LCD cartridge assembly 102 also includes a layer of tempered glass 112 aligned with and positioned above the screen module 110 to protect the upper surface of the screen module 110, to serve as an upper surface to the system 100, and to thereby extend the assembly's service life. In some embodiments, it may be preferable that the tempered glass 112 be placed in physical contact with the upper surface of the screen module 110. It also is contemplated that any other types of layer(s) of lamination(s) and/or membrane(s) may be configured with the LCD screen module 110.

In addition, it also is contemplated that a thermal dissipation system may be configured with the replaceable/removable LCD screen module 110.

In some embodiments, the cartridge assembly 102 also includes a support member 114 (comprising glass or other suitable material(s)) that the screen module 110 may fit into for support and to facilitate the mounting of the screen module 110 into the body's cavity 106. In some embodiments, the support member 114 also may include a Fresnel lens and/or other optical devices.

In some embodiments, the cartridge body 104 is made from a material, including, but not limited to, aluminum, hard plastic, and/or other suitable material(s).

In some embodiments, the LCD screen module 110 includes a connector board 111 configured to enable easy electrical connection and disconnection of the LCD screen module 110 to and from the LCD cartridge assembly 102 as will be described in other sections.

Figure 6:
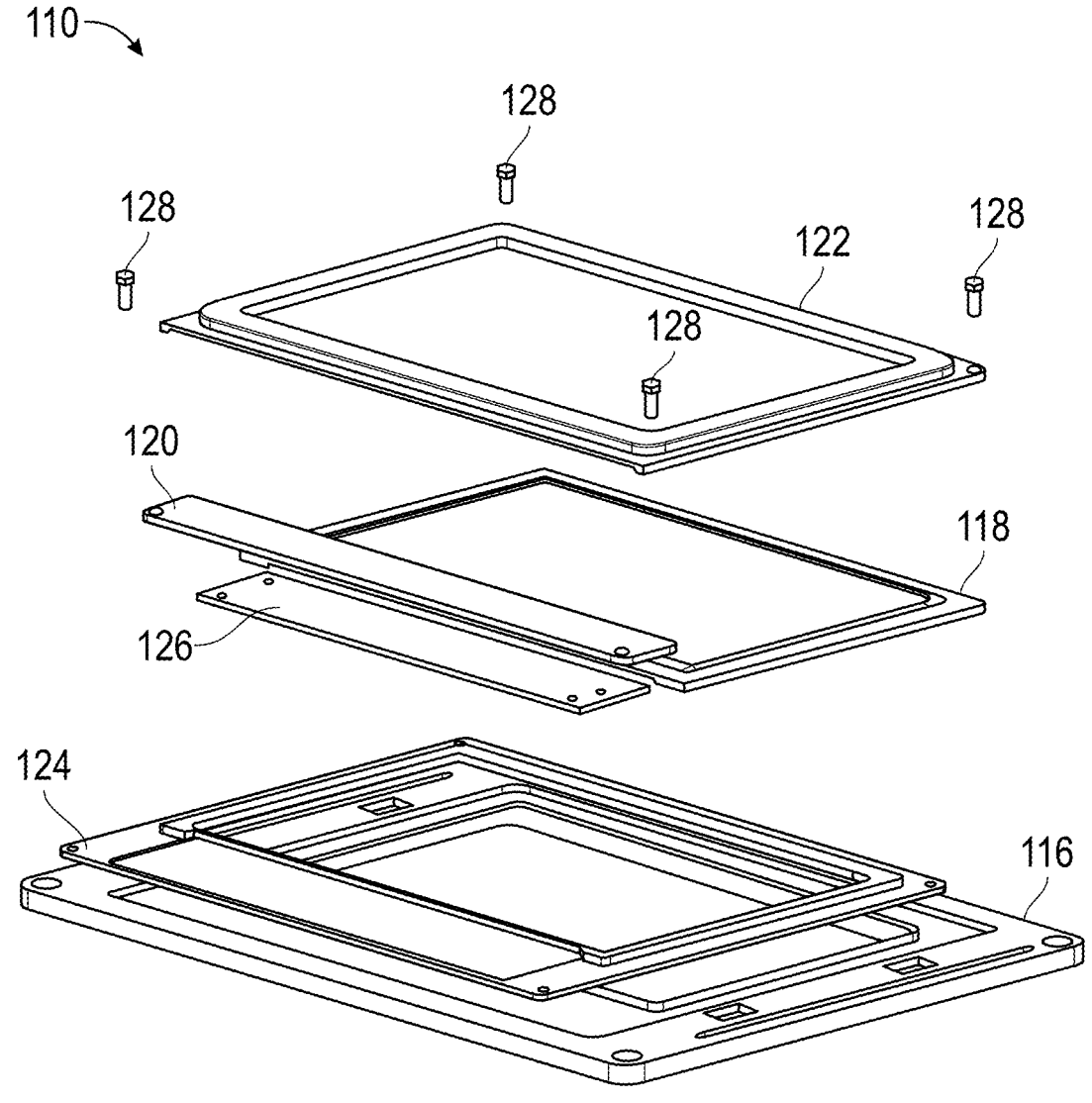
FIG. 6 shows an exploded view of a screen module in some embodiments of the present invention

FIG. 6 shows an exploded view of an exemplary LCD screen module 110. In some embodiments, the LCD screen module 110 comprises a tank cradle or cradle tray 116 that may serve as a base to mount, secure, and otherwise support the various elements of the LCD screen module 110. In some embodiments, the LCD screen module 110 further comprises an LCD screen 118 and a printed circuit board (PCB) cover 120. The LCD screen 118 with PCB cover 120 is assembled (e.g., sandwiched) between a top ring module 122 and a bottom ring module 124, and the combination 118, 120, 122, 124 may be mounted to the cradle tray 116.

In some embodiments, the LCD screen module 110 further comprises a cable area or HDMI connector point 126 configured to receive one or more electrical LCD connection cables. Once configured, the LCD screen 118, the top ring module 122, and the bottom ring module 124 may be secured together and to the cradle tray 116 using one or more fasteners 128. In some embodiments, the fasteners may include threaded screws, nuts and bolts, rivets, snaps, latches, and/or other types of connection devices.

Figure 7A:
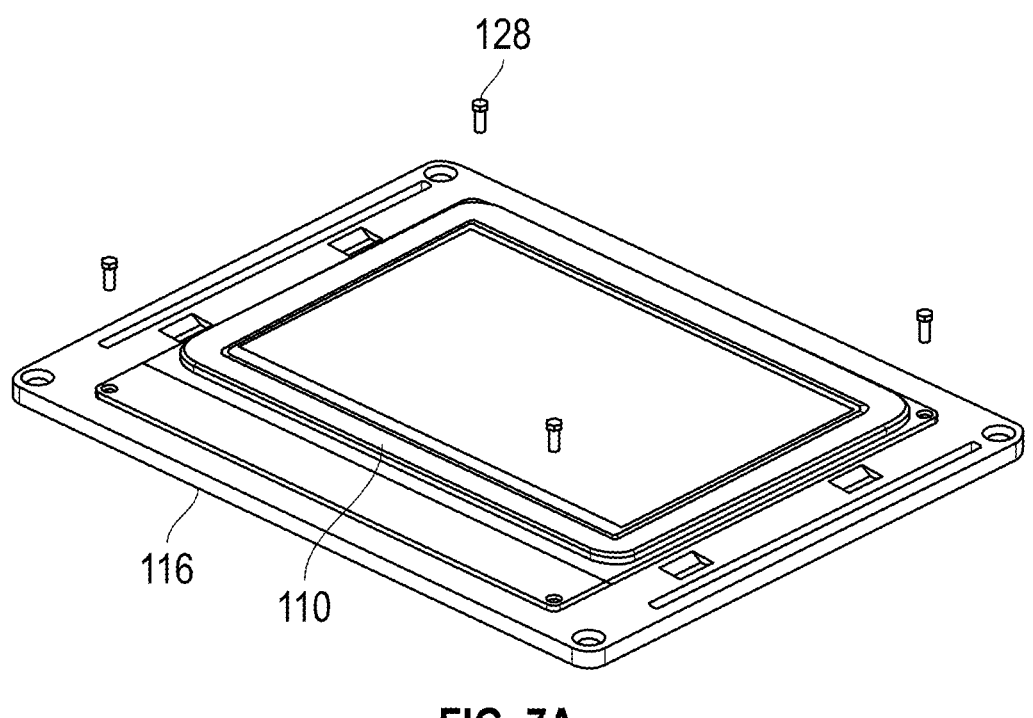
FIGS. 7A-7D show actions taken for disassembling one or more components of the screen module in some embodiments of the present invention.
Figure 7B:
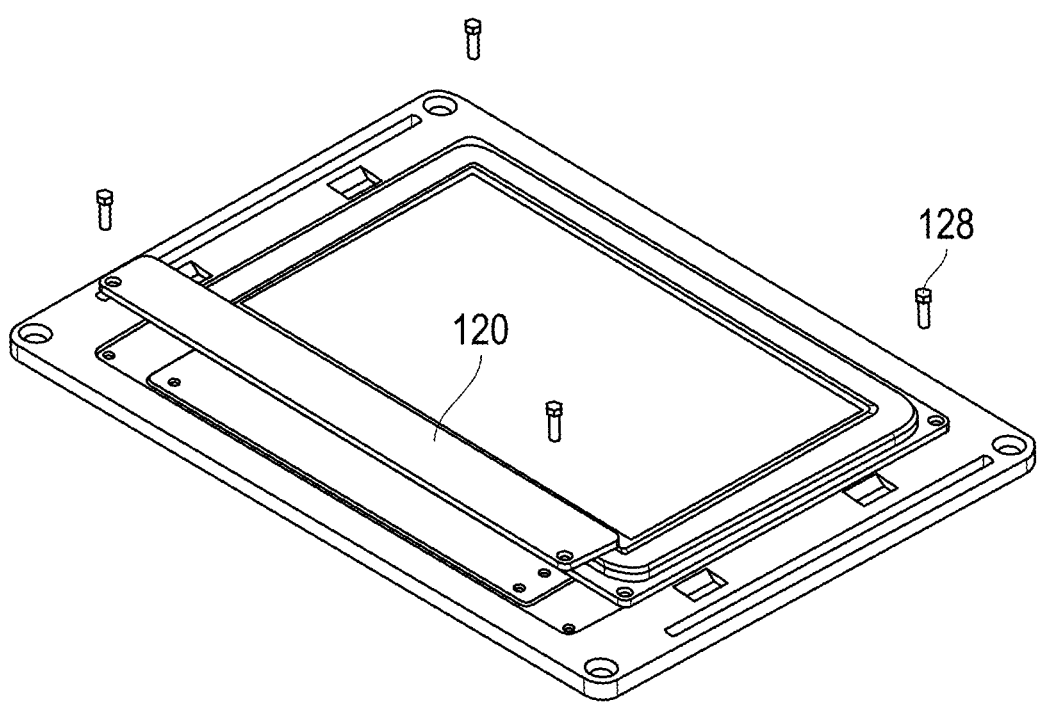
Figure 7C:
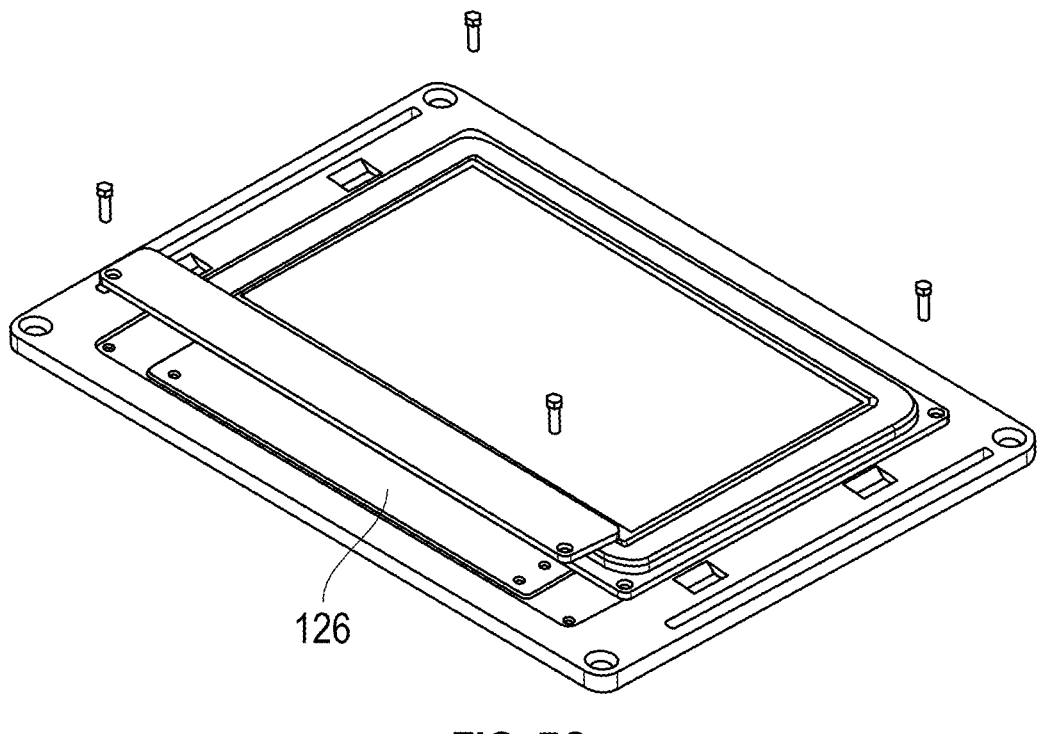
Figure 7D:
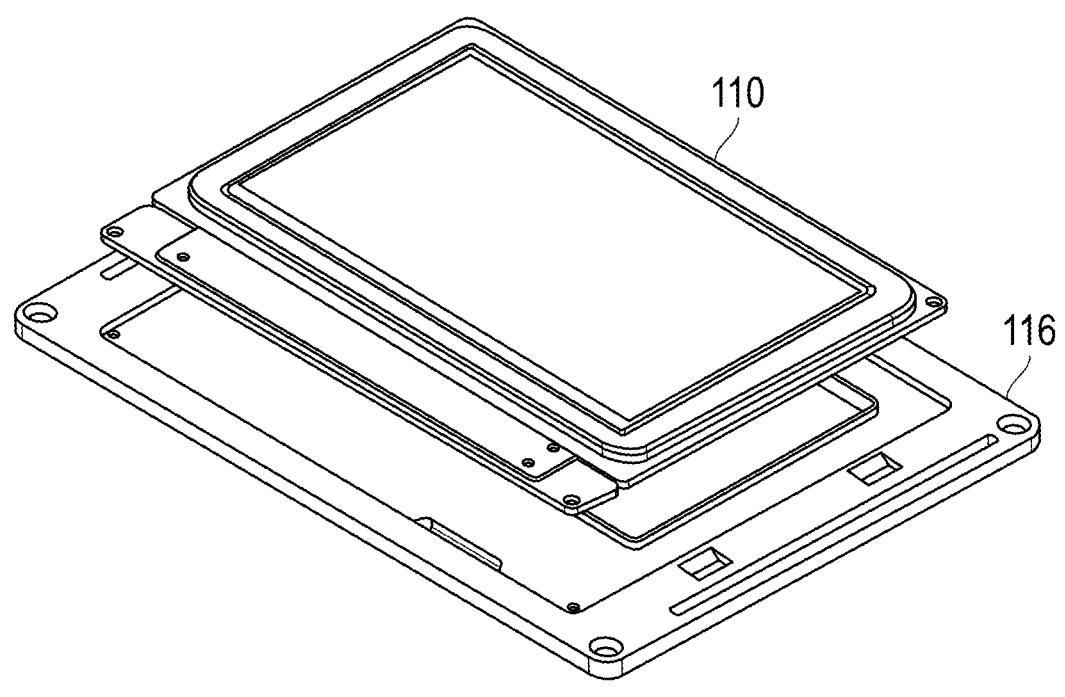

FIGS. 7A-7D show actions that may be taken to disassemble an LCD screen module 110 into its individual elements. For example, FIG. 7A shows the fasteners 128 being removed to release the elements from the cradle tray 116, and FIG. 7B shows the subsequent removal of the PCB cover 120. Next, as shown in FIG. 7C, the LCD cable may be unplugged from the connector point 126, and as shown in FIG. 7D, the elements of the LCD screen module 110 may be removed from the cradle tray 116.

Figure 8A:
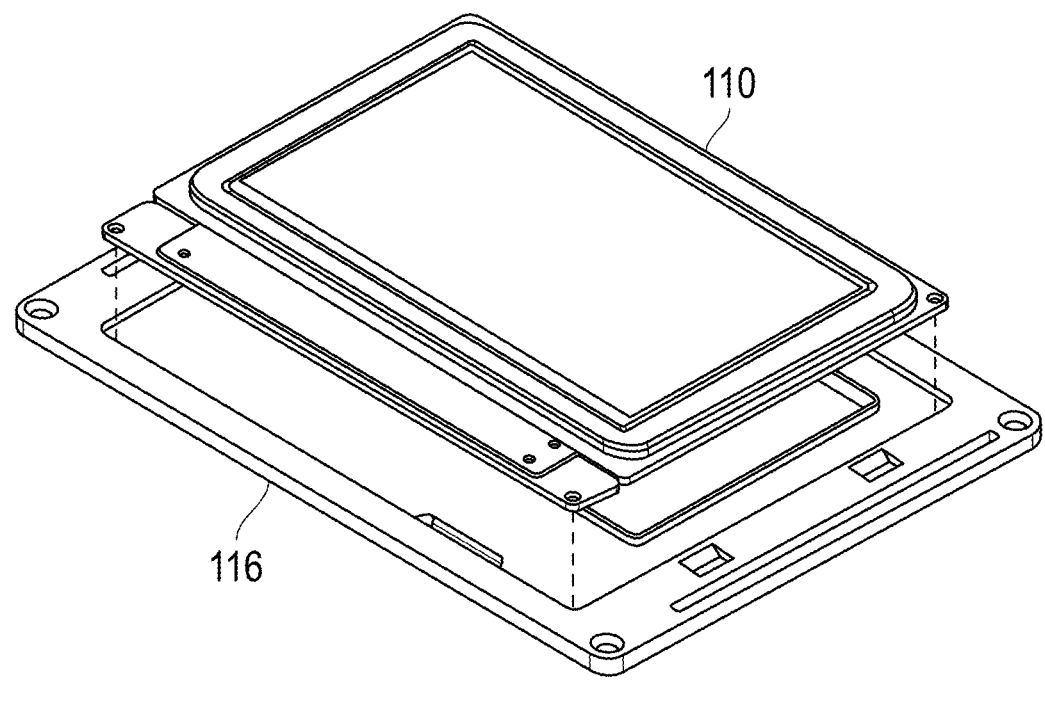
FIGS. 8A-8D show actions taken for assembling one or more components of the screen module in some embodiments of the present invention.
Figure 8B:
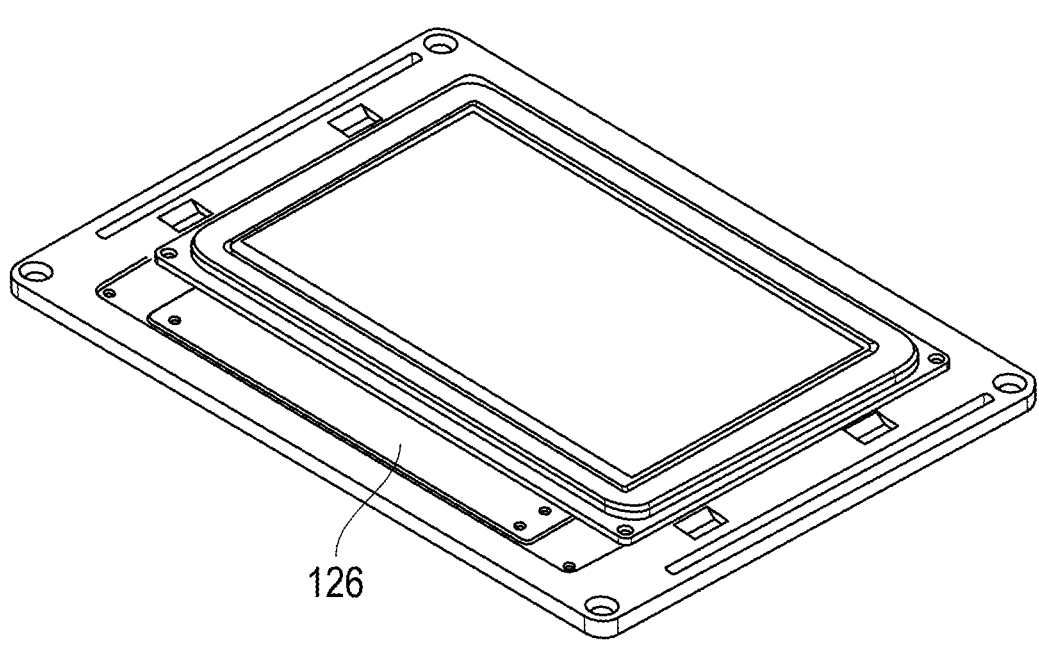
Figure 8C:
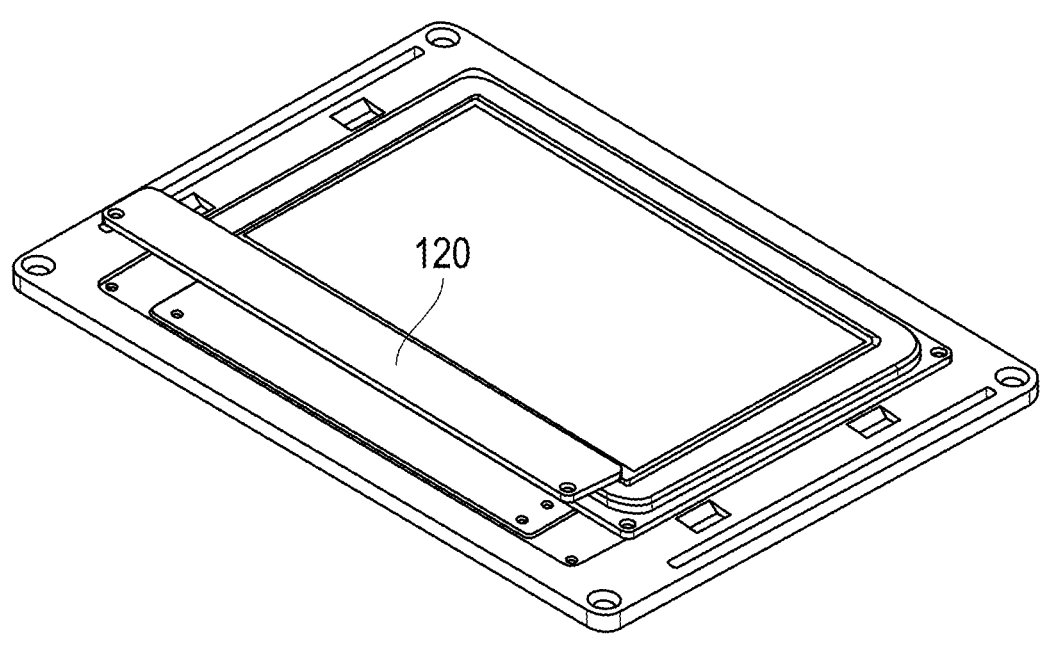
Figure 8D:
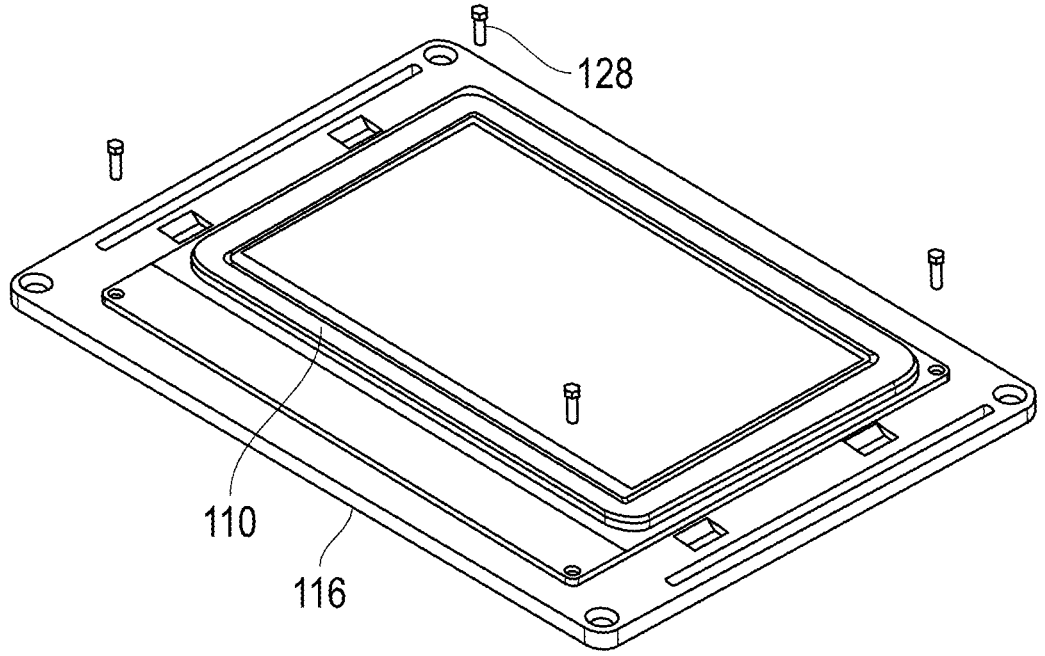

FIGS. 8A-8D show actions that may be taken to assemble the LCD screen module 110. For example, FIG. 8A shows an LCD screen module 110 being placed onto the tank cradle 116. During this action, the LCD screen module 110 is preferably self-aligned with the cradle 116. Next, as shown in FIG. 7B, the LCD cable is plugged into the connector point 126, and as shown in FIG. 7C, the PCB cover 120 is placed onto the LCD screen module 110. The fasteners 128 may then be tightened to secure the LCD screen module 110 and the cradle tray 116 together.

Figure 9:
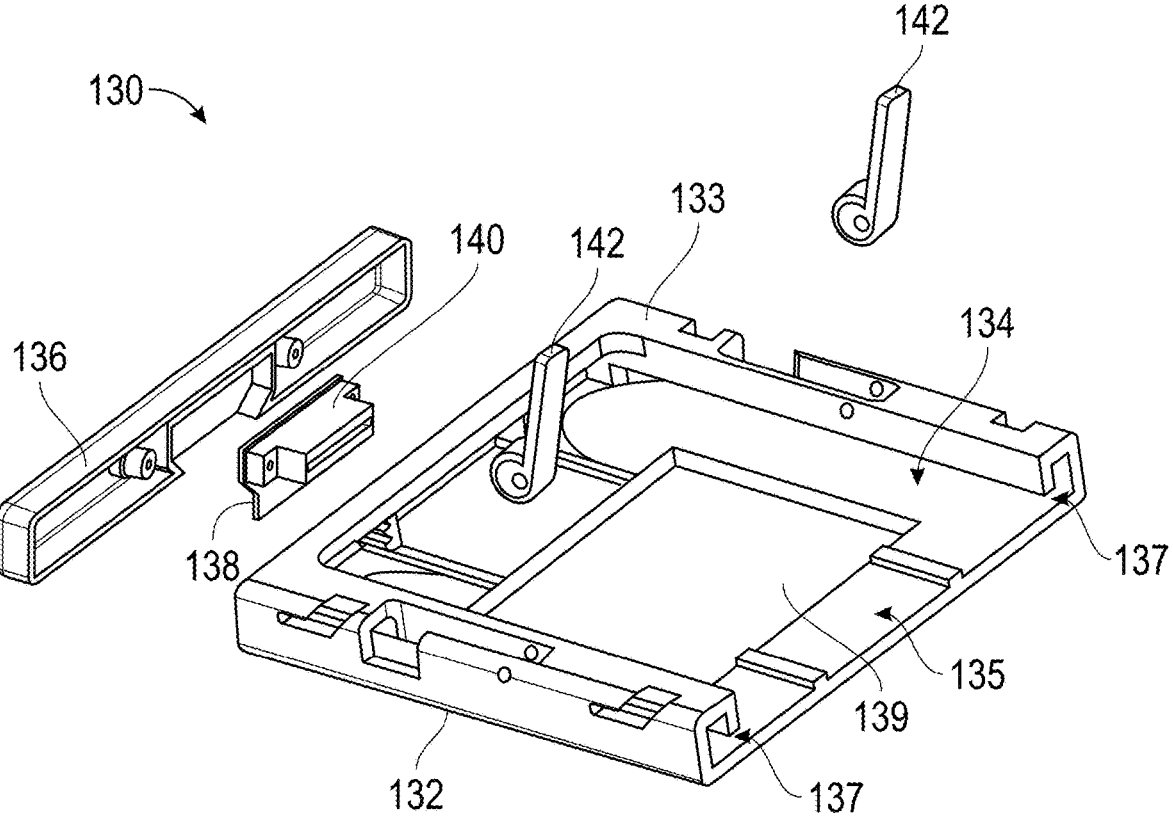
FIG. 9 shows an exploded view of a cradle assembly in some embodiments of the present invention.

FIG. 9 shows an exploded view of an exemplary cradle assembly 130. The cradle assembly 130 comprises a cradle body or cradle base 132 configured to support one or more components of the cradle assembly 130. The cradle body 132 may include a cavity 134 configured to receive, secure, and support the cartridge assembly 102. In some embodiments, the cradle body 132 also includes an endcap 136 that serves to enclose an end of the cradle body 132 generally opposite the frame's open side 135.

In some embodiments, the cradle assembly 130 further comprises a printed circuit board (PCB) 138 and an associated electrical connector 140 (e.g., at the endcap 136) for providing easy electrical connection and disconnection of the cartridge assembly 102 to and from the cradle assembly 130 (e.g., for power and/or control of the LCD). For example, in some embodiments, the LCD cartridge assembly's connector board 111 (see FIG. 5) may preferably be automatically received into the cradle's electrical connector 140 upon insertion of the cartridge assembly 102 into the cradle's cavity 134.

In some embodiments, as described in other sections, the LCD cartridge assembly 102, once inserted into the cradle's cavity 134, may be locked in place using one or more locking mechanisms 142, e.g., cam levers 142 that may be locked and unlocked upon rotation (e.g., 90° rotations up and down).

In some embodiments, the cradle body 132 is made from a material including, but not limited to, aluminum, hard plastic, and/or other suitable material(s).

Figure 10:
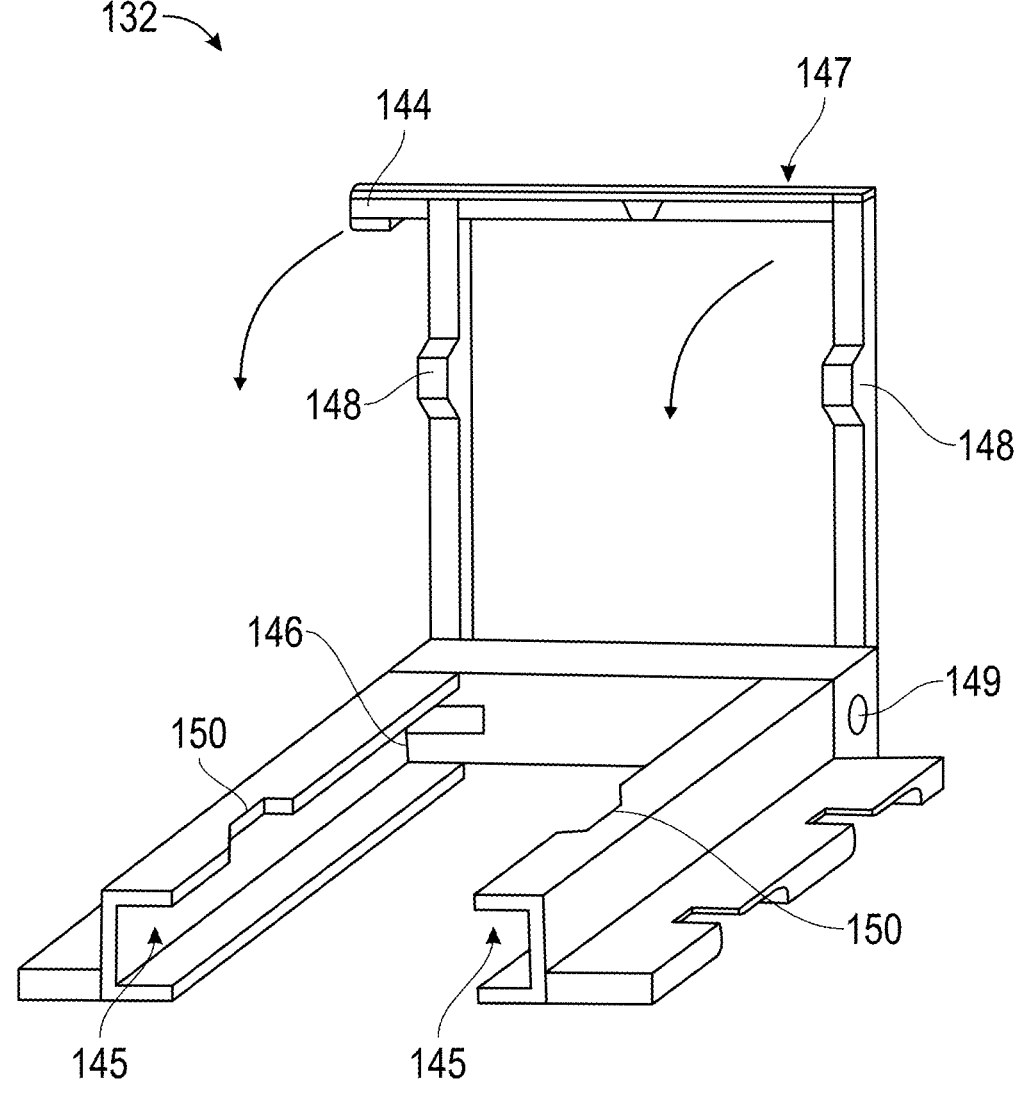
FIG. 10 shows an internal structure of the cradle assembly in some embodiments of the present invention.

Referring to FIG. 10, an internal structure of an exemplary cradle body 132 is illustrated. In some embodiments, the cradle body 132 comprises side slots 145 into which the cartridge assembly 102 may be inserted. The cradle body 132 also may include a locking member 147 rotatable about a pivot point 149 that when in an upward position may unlock the cartridge assembly 102 from the cradle body 132 and that when in a downward position may lock the cartridge assembly 102 thereto. The locking member 147 may include one or more locking mechanisms 144 designed to lock the support member 145 in its down and locked position, e.g., generally against the lower cradle body 132. In addition, in some embodiments, the locking member 147 also may include downward pointing locking tabs 148 that may be received through corresponding notches 150 in the lower cradle body 132 when the locking member 147 is in its down and locked position. As such, the locking tabs 148 may engage with and apply a downward locking force to the cartridge assembly 102 to hold it snug within the slots 145. In some embodiments, the cradle body 132 further includes one or more grooves 146 to expose the LCD modules. The cartridge assembly 102 may be released from the cradle body 132 may moving the locking member 147 into its upward and unlocked position and removing the cartridge assembly 102 from the cradle's slots 145.

Figure 11:
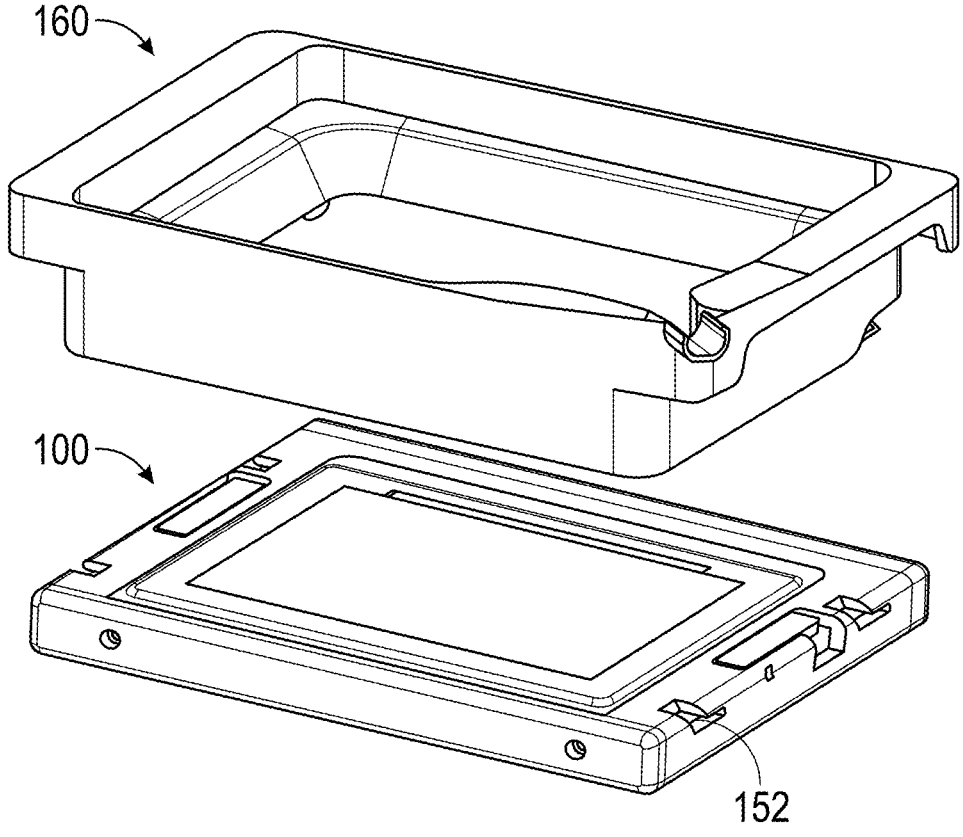
FIG. 11 shows a relationship between a resin tank and the removable LCD screen cartridge in some embodiments of the present invention.

Referring to FIG. 11, a relationship between the LCD screen cartridge system 100 and a resin tank 160 is illustrated. In some embodiments, the LCD screen cartridge system 100 includes one or more attachment mechanisms 152 that may releasably mate with corresponding attachment mechanisms on an underneath side of the resin tank 160. In one example, the attachment mechanisms 152 may include hooks that may be pressed against or otherwise engaged with the corresponding resin tank attachment mechanisms to attach the system 100 thereto. In this example, the hooks may be pressed a second time to be released such that the system 100 may be removed from the tank 160. Other types of suitable releasable attachment mechanisms 152 also may be used. For example, the attachment mechanisms 152 may include hooks that may be inserted into corresponding cavities in the bottom of the resin tank 160 and locked using a sliding motion.

Figure 12:
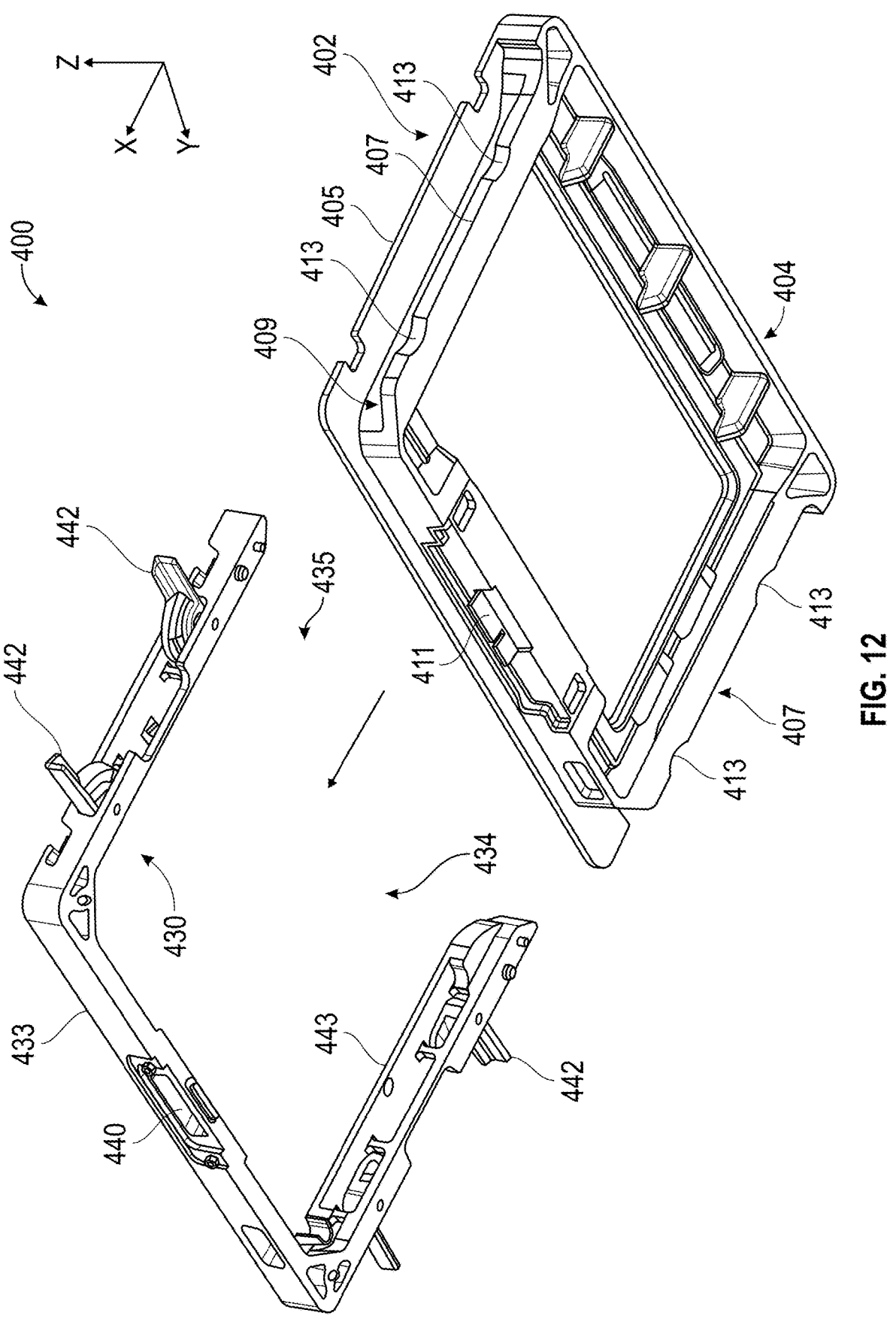
FIG. 12 shows aspects of a replaceable screen cartridge system in some embodiments of the present invention.
Figures 13, 14:
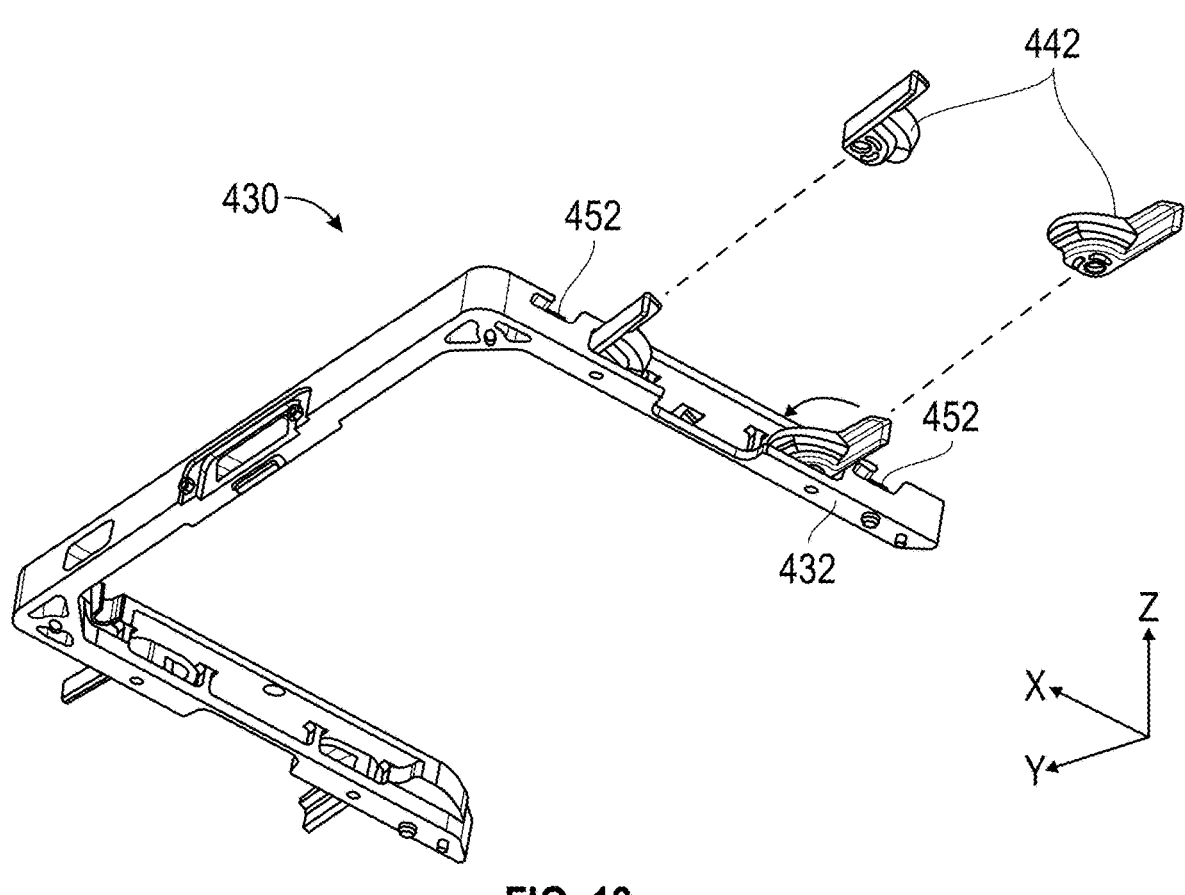
FIG. 13 shows aspects of a cradle assembly in some embodiments of the present invention.
FIG. 14 shows aspects of a locking mechanism in some embodiments of the present invention.

FIGS. 12 and 13 show another embodiment of the cradle assembly 430 and a corresponding cartridge assembly 402. In some embodiments, the cradle assembly 430 includes a cradle body 432 comprising a cradle frame 433. In some embodiments, the cradle frame 433 may include an open side 435. The cradle frame 433 defines an inner recess or cavity 434 into which the cartridge body 404 of the LCD cartridge assembly 402 may be received and secured. In this embodiment, the cartridge assembly 402 may be side-loaded, bottom-loaded (from underneath the cradle assembly 402), and/or by any combinations and/or variants thereof. Once received into the cradle's cavity 434, the LCD cartridge assembly 402 may be releasably locked therein using one or more locking mechanisms 442.

In some embodiments, the cradle assembly 430 includes one or more attachment mechanisms 152 that may be used to attach the system 100 to the underneath side of a resin tank RT. In some embodiments, the attachment mechanisms 452 may generally correspond to the attachment mechanisms 152 as described in regard to other embodiments herein. As shown, the locking mechanisms 442 may be accessible from the sides of the cradle frame 433 for easy access. In this way, the cradle assembly 430 may remain attached to the resin tank RT and the locking mechanisms 442 may be accessed from the sides without requiring the removal of the cradle 430. For example, in some embodiments, the cradle assembly 430 may be semi-permanently attached to the resin tank RT. In addition, it may be preferable that the LCD cartridge assembly 402 seat parallel to the cradle assembly 430 once configured.

In some embodiments, as shown in FIG. 12, the cartridge assembly's body 404 includes first side extensions 405 extending outward from corresponding opposing sides of the body 404, e.g., extending outward from an upper portion of the opposing sides. In addition, the cartridge assembly's body 404 also may include second side extensions 407 extending outward from the corresponding opposing sides at a lower location on the sides. The first and second side extensions 405, 407 are preferably aligned and parallel with one another thereby forming a slot 409 running therebetween. In some embodiments, the second side extension 407 may extend outward a lesser distance than the first side extension 405 so that the second side extension 407 may engage a separate portion of the locking mechanisms 442 as described in other sections. In addition, in some embodiments, the second side extensions 407 may include side indentations 413 (e.g., concave recesses). As will be described herein, the cradle's locking mechanism 442 may be designed to engage with the cartridge's extensions 405, 407 (including the indentations 413) and slot 409 to secure the cartridge assembly 402 within the cradle assembly's cavity 434.

As the cartridge assembly 402 is inserted into the cradle's recess 434, the cartridge's first side extensions 105 may generally align with and/or abut against an inner sidewall 443, e.g., an upper sidewall that generally defines the cradle recess's perimeter. As such, in some embodiments, it may be preferable that the width of the cartridge's body 404 at the outer distal ends of the opposing first side extensions 405 generally match the width of the cradle's recess 434 as defined by the recess's inner sidewalls 443.

In some embodiments, as shown in FIG. 14, the locking mechanisms 442 may include one or more cam levers 442 comprising a lever portion 443 configured with a first cam 446 and a generally concentric second cam 447, with the first cam 446 including a first cam width that is less than the second cam width of the second cam 447. As such, the second cam 447 may extend outward further from the cam lever portion 443 compared to the first cam 446. In addition, the second cam 447 may include a distal cam portion 452 with an increased cam height portion 451. That is, the height of the second cam 447 may increase, e.g., following a convex curvature, towards and/or at its distal end 452. Furthermore, in some embodiments, the increased cam height portion 451 may include a distal notch 453 such that its exterior side may be slightly inset from the far distal end 452 of the second cam 447. In some embodiments, the increased cam height portion 451 also may include a lower gap or cavity 454 between itself and an upper portion of the distal end 452 of the second cam 447 so that the increased cam height portion 451 may be flexible and/or bendable in this area. In this way, the height of the increased cam height portion 451 may flex (e.g., compress downward) to accommodate an engagement surface of the cartridge's second side extension 407 when the cartridge assembly 402 is locked into the cradle assembly 430 as described below.

In some embodiments, as shown in FIGS. 15-18, with the cartridge assembly 402 placed into the cradle assembly's recess 434, the lever cams 442 may be caused to engage with cartridge assembly's extensions 405, 407 and slot 409 to secure the cartridge assembly 402 within the cradle assembly's cavity 434 (e.g., by placing the cam lever 442 into its locked configuration).

FIG. 16 shows a side view of the cartridge assembly 402 with its left side extensions 405, 407 and slot 409 shown in an isolated view at A, and with its right side extensions 405, 407 and slot 409 engaged with an extended cam lever 442 at B. FIG. 17 shows a close-up view of the isolated view at A, and FIG. 18 shows a close-up view of the engaged side at B.

In some embodiments, as shown in FIG. 18, when locked, the cam lever's first cam 446 may physically engage an outer surface of the cartridge assembly's second side extension 409, and preferably, may engage (be snugly received into) a second side extension's indentation 413. In this way, the cartridge assembly 402 is locked along the Y-axis and the X-axis (see FIG. 15 for a depiction of the X-axis). In addition, the cam lever's second cam 447 may be received into the cartridge assembly's slot 409 with its far distal end 452 physically engaging the inner back wall of the slot 409. In this way, the cartridge assembly 402 is further locked along the Y-axis. Furthermore, the second cam 447 also may physically engage the slot's upper wall with its increased cam height portion 451 engaging the slot's lower wall while flexing to provide a snug fit. In this way, the cartridge assembly 402 is locked along the Z-axis.

In some embodiments, as shown in FIGS. 12 and 13, the locking mechanisms 442 (e.g., the cam levers) may be arranged as opposing pairs on each respective side of the cradle assembly 430. That is, a first cam lever 442 on a first side of the cradle assembly 430 may be oriented to lock using a clockwise rotation and a second cam lever 442 on the same first side may be oriented to lock using a counter-clockwise rotation. A similar opposing pair of cam levers 442 also may be implemented on the second side of the cradle 430. In this way, forces applied to the cradle assembly 430 by the opposing cam levers 442 on each side may balance each other out thereby providing further stability of the cartridge assembly 402 during its insertion.

In some embodiments, as shown in FIG. 12, the cradle assembly 430 further comprises an electrical connector 440 (and an associated PCB) that may electrically receive the LCD cartridge assembly's connector board 411 upon insertion of the cartridge assembly 402 into the cradle's cavity 434.

Advantageously, the replaceable/removable LCD screen cartridge of the present invention provides an easy method of assembling and disassembling of the LCD screen module without extensive training or assembly experience. The replaceable/removable LCD screen cartridge eliminates the need to remove the black tape for LCD screen covering. Also, the installation of the HDMI cable may be easier and more convenient compared to the installation of flat ribbon cables of conventional methods. The present invention may utilize a modularized LCD screen and may not require separative parts. Further, the present invention provides an easy self-alignment feature as well as LCD screen shatter protection.

It is understood that any aspect or element of any embodiment of the system 100 described herein may be combined with any other aspect or element of any other embodiment of the system 100 to form additional embodiments of the system 100, all of which are within the scope of the system 100.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A screen cartridge system for a three-dimensional (3D) printer, the 3D printer including a resin tank with a first side for receiving resin-curing light, the screen cartridge system comprising:
a cradle attachable to the first side of the resin tank; and
an illumination screen cartridge releasably attachable to the cradle; wherein:
the illumination screen cartridge provides resin-curing light to the first side of the resin tank,
the illumination screen cartridge is releasably attachable to the cradle using one or more quick-release locking mechanisms, and
the quick-release locking mechanisms include one or more cam levers.

2. The screen cartridge system of claim 1 wherein the illumination screen cartridge includes a liquid crystal display (LCD) screen to provide the resin-curing light.

3. The screen cartridge system of claim 1 wherein the cradle includes a frame defining a cavity and the illumination screen cartridge is releasably attachable within the cavity.

4. The screen cartridge system of claim 1 wherein the illumination screen cartridge includes one or more first side extensions, and the one or more cam levers, when locked, apply a locking force to the one or more first side extensions.

5. The screen cartridge system of claim 1 wherein the illumination screen cartridge includes one or more first side extensions and one or more second side extensions, each one or more first side extensions aligned with, parallel to, and forming a slot between a corresponding one or more second side extensions.

6. The screen cartridge system of claim 5 wherein the one or more cam levers, when locked, apply a locking force to the one or more first side extensions and to the one or more second side extensions.

7. The screen cartridge system of claim 5 wherein the one or more cam levers, when locked, includes a first cam that applies a first locking force to the one or more first side extensions and a second locking force to the one or more second side extensions, and a second cam that applies a third locking force to the one or more second side extensions.

8. The screen cartridge system of claim 7 wherein the one or more second side extensions includes an indentation, and the second cam applies the third locking force to the indentation.

9. The screen cartridge system of claim 1 wherein the one or more cam levers are configured on an outer side surface of the cradle.

10. The screen cartridge system of claim 1 wherein the cradle includes a first electrical connector and the illumination screen cartridge includes a second electrical connector, and the first electrical connector is mated with the second electrical connector when the illumination screen cartridge is attached to the cradle.

11. The screen cartridge system of claim 1 wherein the illumination screen cartridge includes an illuminating surface, and the screen cartridge system further comprises a sheet of tempered glass positioned over the illuminating surface.

12. The screen cartridge system of claim 1 wherein the illumination screen cartridge includes a Fresnel lens.

13. The screen cartridge system of claim 1 wherein the cradle includes one or more hooks adapted to releasably attach the cradle to the first side of the resin tank.

* * * * *